United States Patent
Lani et al.

(10) Patent No.: US 9,792,283 B2
(45) Date of Patent: Oct. 17, 2017

(54) METHOD AND SYSTEM FOR PRESENTING STATISTICAL DATA IN A NATURAL LANGUAGE FORMAT

(71) Applicant: Statistics Solutions, LLC, Clearwater, FL (US)

(72) Inventors: James A. Lani, Clearwater, FL (US); Melissa Moran, Oldsmar, FL (US)

(73) Assignee: INTELLECTUS STATISTICS, LLC, Clearwater, FL (US)

( * ) Notice: Subject to any disclaimer, the term of this patent is extended or adjusted under 35 U.S.C. 154(b) by 0 days.

(21) Appl. No.: 15/213,464

(22) Filed: Jul. 19, 2016

(65) Prior Publication Data

US 2016/0328395 A1  Nov. 10, 2016

Related U.S. Application Data

(63) Continuation of application No. 14/040,029, filed on Sep. 27, 2013, now abandoned.

(51) Int. Cl.

| | | |
|---|---|---|
| G06F 17/20 | (2006.01) | |
| G06F 17/28 | (2006.01) | |
| G06F 17/18 | (2006.01) | |
| G06F 17/21 | (2006.01) | |
| G06F 17/24 | (2006.01) | |
| G06F 17/27 | (2006.01) | |
| G06F 17/30 | (2006.01) | |

(52) U.S. Cl.
CPC .......... *G06F 17/2881* (2013.01); *G06F 17/18* (2013.01); *G06F 17/212* (2013.01); *G06F 17/243* (2013.01); *G06F 17/2715* (2013.01); *G06F 17/30572* (2013.01)

(58) Field of Classification Search
CPC ............................. G06F 17/248; G06F 17/20
See application file for complete search history.

(56) References Cited

U.S. PATENT DOCUMENTS

| | | | |
|---|---|---|---|
| 6,584,445 | B2 | 6/2003 | Papageorge |
| 6,668,203 | B1 | 12/2003 | Cook et al. |
| 7,580,878 | B1 | 8/2009 | Nieto |
| 7,669,133 | B2 | 2/2010 | Chikirivao et al. |
| 7,831,494 | B2 | 11/2010 | Sloan et al. |

(Continued)

OTHER PUBLICATIONS

Beyond Software, Inc., EnterpriseWeb Connect for Application Access, Speaker: Ron Kohl, Beyond Software, Inc., Chart B4, Internet, IBM Enterprisse Connection Conference Call.

*Primary Examiner* — Richemond Dorvil
*Assistant Examiner* — Bryan Blankenagel
(74) *Attorney, Agent, or Firm* — Greenberg Traurig, LLP; Woodrow H Pollack

(57) ABSTRACT

A computer-implemented method for presenting statistical analysis in a natural language textual output comprising: receiving data to be analyzed by the processor; processing the data according to at least one of a plurality of pre-established statistical analysis types, thereby providing processed data; interpreting the processed data by analyzing the processed data to provide a pre-determined natural language text, thereby providing interpreted data; and generating a natural language textual output for the interpreted data according to at least one pre-established rule for converting the interpreted data to a natural language textual output.

14 Claims, 3 Drawing Sheets

(56) References Cited

U.S. PATENT DOCUMENTS

| | | |
|---|---|---|
| 7,856,389 B2 | 12/2010 | Doire et al. |
| 8,196,126 B2 | 6/2012 | Ziegler |
| 2003/0233250 A1 | 12/2003 | Joffe et al. |
| 2004/0064552 A1* | 4/2004 | Chong ................ G06F 11/3006 709/224 |
| 2005/0112536 A1* | 5/2005 | Frayman ................ G09B 19/00 434/247 |
| 2006/0212376 A1 | 9/2006 | Snyder et al. |
| 2007/0169021 A1* | 7/2007 | Huynh ................ G06F 19/3487 717/136 |
| 2008/0188330 A1* | 8/2008 | Doherty ................ A63B 69/36 473/407 |
| 2008/0243558 A1 | 10/2008 | Gupte |
| 2009/0112787 A1 | 4/2009 | Ginzberg |
| 2009/0234791 A1* | 9/2009 | Delmonico ............ G06N 5/045 706/50 |
| 2009/0292719 A1* | 11/2009 | Lachtarnik ............ G06F 17/27 |
| 2010/0106609 A1 | 4/2010 | Sherman et al. |
| 2010/0145720 A1 | 6/2010 | Reiner |
| 2011/0072117 A1* | 3/2011 | Wessling ............ G06F 17/3002 709/221 |
| 2011/0301941 A1 | 12/2011 | De Vocht |
| 2012/0011080 A1 | 1/2012 | Smith et al. |
| 2013/0144605 A1 | 6/2013 | Brager et al. |

\* cited by examiner

302 — Receiving, via a web-based submission, data to be statistically analyzed and a pre-selected statistical analysis type 304 — Verify Data 306 — Informative text returned to client 308 — Interpret data according to the pre-selected statistical analysis type 310 — Interpreted Data appropriate for another statistical analysis type 312 — Generate natural language output from the interpreted data

METHOD AND SYSTEM FOR PRESENTING STATISTICAL DATA IN A NATURAL LANGUAGE FORMAT

RELATED APPLICATION DATA

This application is a continuation-in-part of application Ser. No. 14/040,029, filed Sep. 27, 2013, entitled "Method and System for Presenting Statistical Data in a Natural Language Format," the contents of which are fully incorporated by reference herein for all purposes.

TECHNICAL FIELD

This disclosure relates to a method for processing and interpreting statistical analyses and presenting the results of the analyses as plain language text. More particularly, this disclosure relates to the interpretation of quantitative data on a battery of surveys thereby presenting a profile.

BACKGROUND OF THE INVENTION

Statistical analysis is vital in almost every industry. But connecting mathematical values and results to their natural language meaning has troubled generations. While experts are able to understand the meaning of the statistical analysis, those with less expertise are not.

Thus, there exists a need in the industry to overcome these problems (and others) and provide a method and system for presenting statistical analysis in a natural language textual output. Additionally, there exists a need to interpret the statistical analysis, and convert the interpreted statistical analysis into natural language prose.

SUMMARY OF THE INVENTION

According to one embodiment, this disclosure provides a computer-implemented method for presenting statistical analysis in a natural language textual output, the computer-implemented method employing a processor and comprising receiving data to be analyzed by the processor and processing the data according to at least one of a plurality of pre-established statistical analysis types, thereby providing processed data. The method may further comprise interpreting the processed data by converting the processed data to a pre-determined natural language text, thereby providing interpreted data, and generating a natural language textual output for the interpreted data according to at least one pre-established rule for converting the interpreted data to a natural language textual output. The computer-implemented method may be configured to function in a dynamic real-time mode.

The disclosed method has several important advantages. For example, the disclosed method permits the rapid interpretation of complex statistical data by a layperson.

A further possible advantage of the disclosed method includes enabling a financial investor to rapidly interpret changes to a stock value and decide whether to buy or sell a particular stock.

Various embodiments of the present disclosure may have none, some, or all of these advantages. Other technical advantages of the present disclosure may also be readily apparent to one skilled in the art.

BRIEF DESCRIPTION OF THE DRAWINGS

For a more complete understanding of the present disclosure and its advantages, reference is now made to the following descriptions, taken in conjunction with the accompanying drawings, in which:

FIG. 3 is a flowchart outlining the steps of one embodiment of the present disclosure.

Similar reference numerals refer to similar parts or steps throughout the several views of the drawings.

DETAILED DESCRIPTION OF THE EMBODIMENTS

The present disclosure relates to a method for analyzing statistical data and presenting the analysis in a textual or prose format (i.e., common language). The method will use stored rules for determining the interpretation of the statistical data and the text of the output. The method can function in conjunction with a computer processor in a dynamic, real-time mode. One possible example is the interpretation of quantitative data on a stock value over a time frame and providing a textual report to less expert recipients, including average stock holders or decision makers. The various components of the present invention, and the manner in which they interrelate, are described in greater detail hereinafter.

Figure 1:
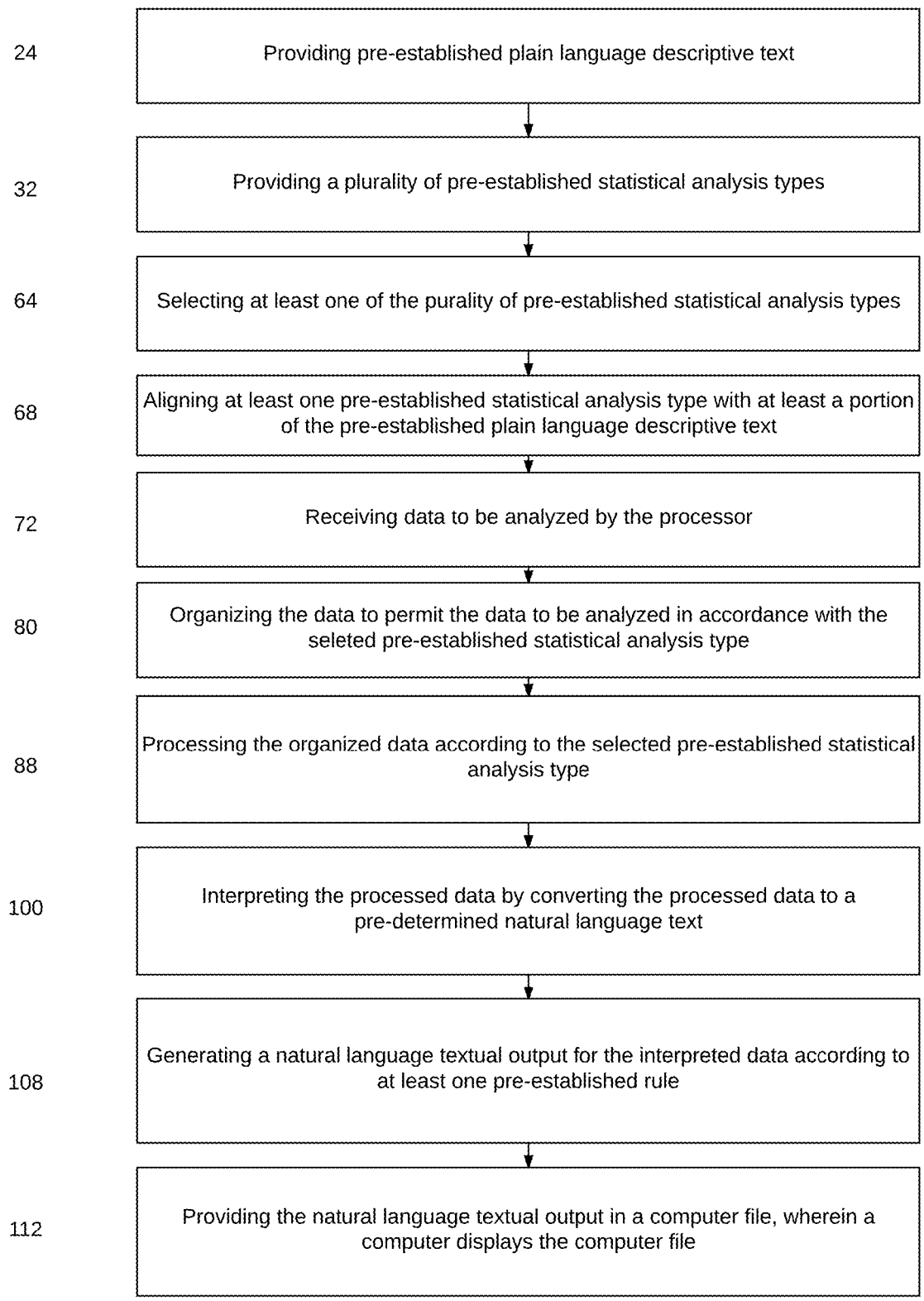
FIG. 1 is a flowchart outlining the steps of one embodiment of the present disclosure.

Initially with reference to FIG. 1, one embodiment of the present invention comprises a computer-implemented method 10 for presenting statistical analysis in a natural language textual output, the method employing a processor and comprising providing pre-established plain language descriptive text 24, providing a plurality of pre-established statistical analysis types 32, wherein the statistical analysis types include frequency, percentage, mean, standard deviation, independent sample t test, dependent sample t test, analysis of variance between groups, correlation, linear regression, chi square, and multiple linear regression.

One embodiment of the present invention further comprises selecting at least one of the plurality of pre-established statistical analysis types 64, aligning at least one of the plurality of pre-established statistical analysis types with at least a portion of the pre-established plain language descriptive text 68, receiving data to be analyzed by the processor 72, wherein the data comprises at least one of numerals and parameters.

Another embodiment of the present invention further comprises organizing the data to permit the data to be analyzed in accordance with the selected pre-established statistical analysis type 80, thereby providing organized data, and processing the organized data according to the selected pre-established statistical analysis type 88, wherein the processing is performed by a web-based open source statistical analysis tool, for providing processed data.

Yet another embodiment of the invention further comprises interpreting the processed data by converting the processed data to pre-determined natural language text 100, thereby providing interpreted data.

Another embodiment of the invention further comprises generating a natural language textual output 108 for the interpreted data according to at least one pre-established rule, the at least one pre-established rule comprising merging at least a portion of the pre-established plain language descriptive text with the natural language text, wherein the output further comprises at least one graphic display, and wherein the graphic display is selected from the group consisting of a table, a chart, and a graph, and providing the natural language textual output in a computer file 112, wherein the computer file displays the natural language textual output.

Figure 2:
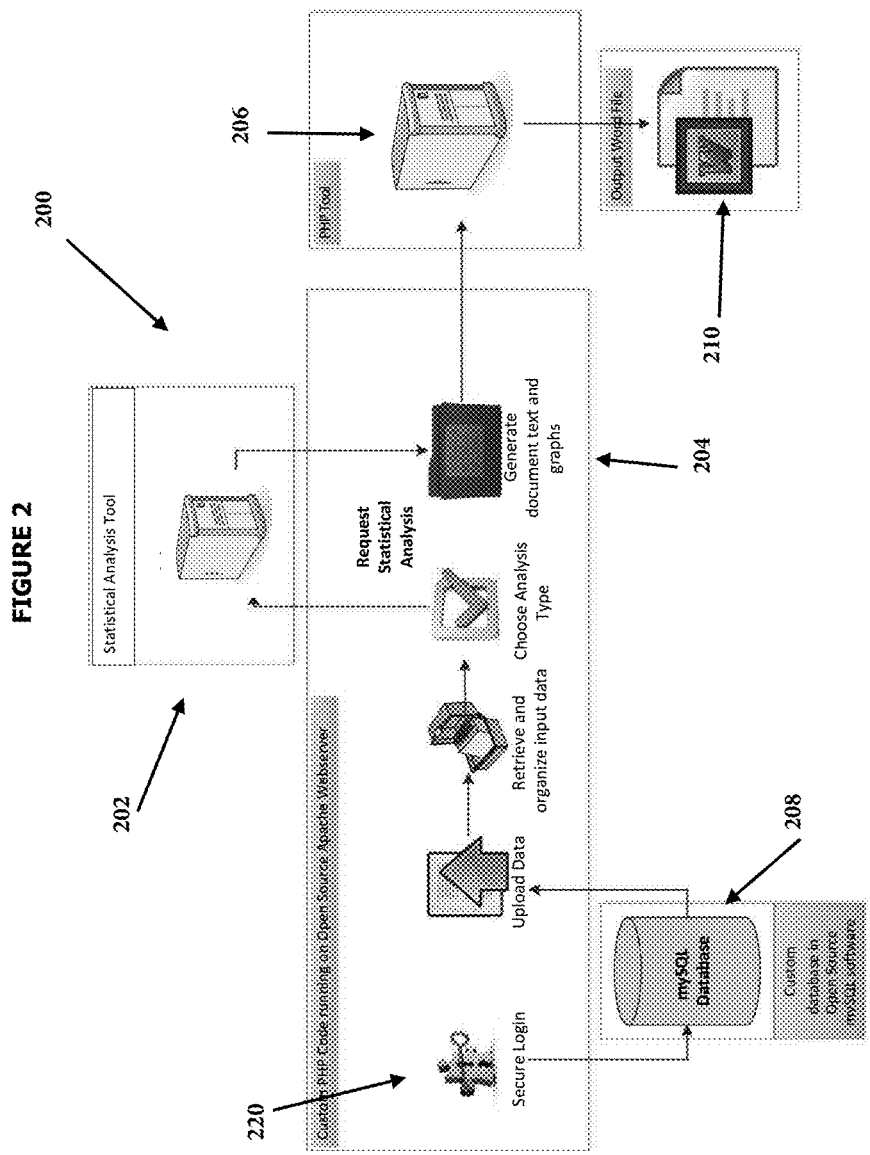
FIG. 2 depicts a system in accordance with one embodiment of the present disclosure.

Turning to FIG. 2, a system 200 in accordance with the present disclosure is depicted. The system 200 comprises a statistics engine 202, an interpretation engine 204, and a recommendation engine 206. The statistics engine 202, interpretation engine 204, and recommendation engine 206 are each preferably configured to run on one or more processors. These processors may be located in one or more machines, and may communicate with one another through any communication capability, such as a bus, a network, or the like. In another embodiment, each these engines may run on the same processor.

In a preferred embodiment, the statistics engine 202 uses an open source statistical analysis tool such as R. The statistics engine 202 is preferably configured to process data to be processed. Thus, the statistics engine 202 preferably receives raw or pre-formatted data and performs statistical analysis on that data. The data (both before and after processing) may be stored or persisted in one or more databases 208. In one embodiment, the database 208 is a MySQL database.

The interpretation engine 204 receives the statistical analysis data from the statistics engine 204 and interprets that data according to pre-configured rules. These rules may also be stored in one or more databases 208, or may be hard-coded into the interpretation engine 204. The interpretation rules may be stored separately from the data itself.

The recommendation engine 206 receives the interpreted data and generates natural language textual output based upon the interpreted data. This output is preferably recommendations to the reader based upon the statistical analysis and interpretation performed by the statistics engine 202 and interpretation engine 204.

In one preferred embodiment, the recommendation engine 206 generates a word processing file, such as a MICROSOFT WORD file. This word processing file includes natural language prose providing analysis and recommendations based on the data processed by the system 200.

FIG. 3 shows another embodiment of the present disclosure. The method 300 receives, via a web-based submission, data to be statistically analyzed and a pre-selected statistical analysis type to apply to the data 302. The method 300 verifies that the data provided is appropriate for the pre-selected statistical analysis type 304. If the data is not appropriate, informative text about the issue is returned to the client 306. If the data is appropriate, the method 300 continues by interpreting the data 308.

The below pseudo-code demonstrates a preferred embodiment for verifying whether or not the data is appropriate for the pre-selected analysis type:

```
# check normality
    if (analysis.type == "Type A") {
        normality = normality.test(y, method = normality.method,
data = data)
        if (normality$sig) {
            clt_text = character(3)
            clt_type = c("normal", "italic", "normal")
            clt_text[1] = " With a sufficiently large sample size
("
            clt_text[2] = "n"
            clt_text[3] = " > 100), deviations from normality will
have little effect on the results."
        } else {
            clt_type = "normal"
            clt_text = " "
```

```
    }
}
```

As shown above, for a statistical analysis type "Type A", the method may determine whether the data provided is sufficient. For this example, certain informative text is provided (ie. "With a sufficiently large sample size (n>100), deviations from normality will have little effect on the results") if the data provided is not appropriate for the pre-selected analysis.

Returning to FIG. 3, once verified, the data is interpreted using the pre-selected analysis type 308. The interpreted data is then reviewed to determine if, based on the results of the analysis, it would be appropriate to perform another statistical analysis type on the data 310. If the data is appropriate for another statistical analysis type, it return to step 308 to be further analyzed with this additional statistical analysis type. If it not appropriate for further analysis, the results of all of the interpretations are provided to the client in a natural language format, preferably in a downloadable word processing file 312.

The following pseudo-code shows a preferred embodiment for determining whether the interpreted data would benefit from another statistical analysis type:

```
analysisfunction <- function(data) {
    ...
}
.output <- c( )
if (no.of.vars(data) < 3) {
    test.a <- function_1(data)
    .output <- c(.output, "Analysis type 'a' was conducted for
", data , " using function_1.")
} else {
    test.a <- function_2(data)
    .output <- c(.output, "Analysis type 'a' was conducted for
", data , " using function_2.")
}
if (test.a < 100) {
    test.b <- perform.test.b(data)
    .output <- c(.output, "Analysis type 'b' was conducted
since the value of analysis type 'a' was less than 100.")
    .output <- c(.output, "The results of analysis type 'b'
were " , test.b , ".")
}
```

As shown above, based on the input data, particular informative text is provided back to the client. After "test.a" is performed, the results of "test.a" are reviewed and based on those results, (i.e. "test.a <100") the system determines another test (i.e. test.b) should be performed.

It should be appreciated by one skilled in the art that the methods described herein can be configured to function in a dynamic, real-time mode.

It will be understood by those of skill in the art that flowcharts and block diagrams herein described may illustrate architecture, algorithms, functionality, and operation of possible implementations of systems, methods and computer program products according to various embodiments. Therefore, it will be understood that each block in the flowchart or block diagram may represent a module, segment, or portion of code, which comprises one or more executable computer program instructions for implementing the specified logical function or functions. Further, some implementations may include the functions in the blocks occurring out of the order as herein presented. By way of non-limiting example, two blocks shown in succession may be executed substantially concurrently, or the blocks may at times be executed in the reverse order, depending upon the functionality involved. It will also be noted that each block of the block diagrams and flowcharts, and combinations of blocks in the block diagram and flowchart illustrations, may be implemented by special purpose hardware-based systems that perform the specified functions or acts, or combinations of special purpose hardware and computer program instructions.

The method 100, 300 and system 200 may preferably be implemented in a computing system, which can include a personal computer, a workstation, a network computer, a hand held computer, or any other computing system. Further, the system 200 may be written as a software program in any appropriate computer language.

The system 200 includes one or more processing devices, which may be any computer processing unit, and could be a single central processing unit, or a number of processing units configured to operate either in sequence or in parallel. The processing device can be configured to execute software processes which implement the steps disclosed herein. The system may also include a memory capable of storing the steps necessary for a processing device to implement the steps disclosed herein. This memory could be in the form of memory resident within the processing device or in the form of standalone memory coupled to the processing unit via a communication path, such as a bus or a network.

Although this disclosure has been described in terms of certain embodiments and generally associated methods, alterations and permutations of these embodiments and methods will be apparent to those skilled in the art. Accordingly, the above description of example embodiments does not constrain this disclosure. Other changes, substitutions, and alterations are also possible without departing from the spirit and scope of this disclosure.

What is claimed is:

1. A computer-implemented method for presenting statistical analysis findings in a natural language textual output, the computer-implemented method employing a processor and comprising:

providing pre-established plain language descriptive text;

providing a plurality of pre-established statistical analysis types, wherein the analysis types include at least one of inferential statistical analyses, non-parametric analysis, data mining analyses (association rules, neural networks, generalized additive models, classification and regression trees, predictive models, CHAID models, cluster analyses, data reduction, classification models), supervised and unsupervised models, time series models, structural equation models, medical informatics, bioinformatics, and fraud detection models;

selecting at least one of the plurality of pre-established statistical analysis types;

aligning the at least one of the plurality of pre-established statistical analysis types with at least a portion of the pre-established plain language descriptive text;

receiving data to be analyzed by the processor through a secure login module, wherein the data comprises at least one of numerals and parameters;

organizing the data to permit the data to be analyzed in accordance with the selected pre-established statistical analysis type, thereby providing organized data;

processing the organized data according to the selected pre-established statistical analysis type, wherein the processing is performed by a statistical analysis tool for providing processed data and wherein if the data is not statistically appropriate for the selected pre-established statistical type, replacing the pre-established plain language descriptive text with informative text explaining the data is not appropriate for the selected pre-established statistical type;

interpreting the processed data by converting the processed data to a pre-determined natural language text, thereby providing interpreted data;

using one of the pre-established statistical analysis types, determining whether the interpreted data should be processed with a second pre-established statistical analysis type, wherein the second pre-established statistical analysis type is not the previously selected pre-established statistical type;

generating a natural language textual output for the interpreted data according to at least one pre-established rule, the at least one pre-established rule comprising:
dynamically merging at least a portion of the pre-established plain language descriptive text with the natural language text using at least one of the pre-established statistical analysis wherein the output may further comprise at least one graphic display, and wherein the graphic display is selected from the group consisting of a table, a chart, and a graph; and providing the natural language textual output in a computer file, wherein a computer displays the natural language textual output in a formatted word processing document.

2. A computer-implemented method for presenting statistical analysis in a natural language textual output, the computer-implemented method employing a processor and comprising:

receiving data to be analyzed by the processor through a secure login module;

processing the data according to at least one of a plurality of pre-established statistical analysis types, thereby providing processed data;

interpreting the processed data and converting the processed data to a pre-determined natural language text, thereby providing interpreted data;

using one of the pre-established statistical analysis types, determining whether the interpreted data should be processed with a second pre-established statistical analysis type, wherein the second pre-established statistical analysis type is not the pre-established statistical type previously selected used to process the data;

generating a natural language textual output for the dynamically interpreted data according to at least one pre-established rule for converting the interpreted data to a natural language textual output; and providing the natural language textual output in a computer file, wherein a computer displays the natural language textual output in a formatted word processing document.

3. The method according to claim 2, further comprising providing pre-established plain language descriptive text and aligning at least one of a plurality of statistical analysis types with at least a portion of the pre-established plain language descriptive text.

4. The method according to claim 3, wherein the plurality of pre-established statistical analysis types include at least one of inferential statistical analyses, non-parametric analysis, data mining analyses (association rules, neural networks, generalized additive models, classification and regression trees, predictive models, CHAD models, cluste analyses, data reduction, classification models), supervised and unsupervised models, time series models, structural equation models, medical informatics, bioinformatics, and fraud detection models.

5. The method according to claim 4, further comprising selecting at least one of the plurality of pre-established statistical analysis types.

6. The method according to claim 2, wherein the data further comprises at least one of numerals and parameters.

7. The method according to claim 6, wherein the data comprises quantitative data.

8. The method according to claim 6, wherein the data comprises business data.

9. The method according to claim 2, further comprising organizing the data to permit the data to be analyzed in accordance with the at least one of a plurality of pre-established statistical analysis types, thereby providing organized data.

10. The method according to claim 9, further comprising processing the organized data according to the at least one of a plurality of statistical analysis types.

11. The method according to claim 2, wherein the processing is performed by a statistical analysis tool for providing processed data.

12. The method according to claim 3, wherein the at least one pre-established rule further comprises merging at least a portion of the pre-established plain language descriptive text with the pre-determined natural language text.

13. The method according to claim 2, wherein the natural language textual output may further comprise at least one graphic display.

14. The method according to claim 13, wherein the at least one graphic display is selected from the group consisting of a table, a chart, and a graph.

* * * * *